US009797116B2

(12) United States Patent
Metzger

(10) Patent No.: US 9,797,116 B2
(45) Date of Patent: Oct. 24, 2017

(54) DEVICE AND PROCESS FOR CONTROLLING AND OPTIMIZING HYDRAULIC SYSTEM PERFORMANCE

(71) Applicant: Caterpillar Inc., Peoria, IL (US)

(72) Inventor: Rustin Metzger, Congerville, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 14/933,427

(22) Filed: Nov. 5, 2015

(65) Prior Publication Data

US 2017/0130427 A1 May 11, 2017

(51) Int. Cl.

*E02F 9/22* (2006.01)
*G06F 7/00* (2006.01)
*F15B 13/02* (2006.01)
*F15B 21/00* (2006.01)
*E02F 3/84* (2006.01)
*E02F 3/76* (2006.01)

(52) U.S. Cl.

CPC ............ *E02F 9/2225* (2013.01); *E02F 3/844* (2013.01); *E02F 9/2267* (2013.01); *F15B 13/02* (2013.01); *F15B 21/005* (2013.01); *E02F 3/7609* (2013.01)

(58) Field of Classification Search

CPC .. A01B 63/1117; E02F 9/2029; E02F 9/2228; E02F 9/2235; E02F 9/2004; E02F 9/2285; E02F 9/205; E02F 9/2217; E02F 9/2257; E02F 9/2292; E02F 9/2296; E02F 9/226; E02F 3/432; E02F 3/434; E02F 9/2225; E02F 9/2267; E02F 3/844; E02F 3/7609; B62D 5/061; B62D 5/08; B62D 5/30; B62D 12/00; B62D 21/08; B60G 3/145; B60G 11/18; B60G 17/0155; B60G 17/018; B60G 17/0195; F15B 11/162; F15B 11/17; F15B 11/08; F15B 13/022; F15B 13/0417; F15B 21/087; F15B 21/082; F15B 13/02; F15B 21/005; F04B 49/002; F04B 49/02

USPC ................ 91/445, 447, 461, 449, 459, 465; 180/420, 441, 406; 60/384, 402, 461, 60/329, 431, 445; 37/348, 414; 172/2-11, 811; 701/50, 82

See application file for complete search history.

(56) References Cited

U.S. PATENT DOCUMENTS 3,680,588 A * 8/1972 Hufeld .................. F15B 11/162 137/596.18
3,700,396 A * 10/1972 Adams .................... F15B 21/08 91/449

(Continued)

*Primary Examiner* — Robert Pezzuto

(57) ABSTRACT

A system and process of controlling a hydraulic system in a work machine includes determining if an operation of the hydraulic system of the work machine meets a predetermined criteria with a controller, and operating a drain valve of the hydraulic system such that there is a minimum flow from a hydraulic pump to a drain if the operation of the hydraulic system of the work machine does not meet the predetermined criteria via the controller. The system and process further operating the drain valve of the hydraulic system such that there is a limited flow from the hydraulic pump to the drain if the operation of the hydraulic system of the work machine meets the predetermined criteria via the controller such that the predetermined criteria comprises at least a predetermined time period T since the work implement system of the work machine has been operated.

19 Claims, 6 Drawing Sheets

(56) References Cited

U.S. PATENT DOCUMENTS

| | | | | |
|---|---|---|---|---|
| 3,935,918 | A * | 2/1976 | Hicks | B62D 12/00 180/406 |
| 5,999,872 | A | 12/1999 | Kinugawa et al. | |
| 7,007,466 | B2 | 3/2006 | Price | |
| 7,725,234 | B2 | 5/2010 | Shull | |
| 8,234,860 | B2 | 8/2012 | Beschorner et al. | |
| 8,695,333 | B2 * | 4/2014 | Vigholm | E02F 9/2217 60/461 |
| 8,899,031 | B2 | 12/2014 | Turnis et al. | |
| 2014/0165546 | A1 | 6/2014 | Metzger et al. | |

* cited by examiner

DEVICE AND PROCESS FOR CONTROLLING AND OPTIMIZING HYDRAULIC SYSTEM PERFORMANCE

TECHNICAL FIELD

The disclosure generally relates to optimizing operation of a hydraulic system; and more particularly, relates to a system and process for optimizing operation of a hydraulic system including operation of a hydraulic pump.

BACKGROUND

A variety of work machines such as, loaders, excavators, motor graders, and other types of construction, work, and earth moving machinery use one or more hydraulically actuatable implements for accomplishing a task. These hydraulically actuatable implements may be operated by a hydraulic actuator, such as, a cylinder and a piston assembly. The cylinder may be in fluid communication with a hydraulic pump for providing pressurized fluid to the chambers thereof, as well as in fluid communication with a fluid source or a tank for draining pressurized fluid therefrom. A valve arrangement may be connected between the pump and the cylinder and/or between the cylinder and the fluid source to control the flow rate and direction of pressurized fluid to and from the chambers of the cylinder.

The rate of flow through the hydraulic valve may be dependent upon a hydraulic pump flow (that is, available fluid flow from the pump). For example, an operating hydraulic pump (e.g., partially upstroked) can typically provide a consistent flow of hydraulic fluid. Whereas a hydraulic pump that is not currently operating at full capacity will typically have a delayed flow of fluid (due to hydraulic pump upstroke) as it is started, speeded up, or the like. As the pump flow varies, the fluid flow through the hydraulic valve may vary.

Implement response is a critical performance criteria and is subject to the available fluid flow from the pump. Therefore, the response of an implement hydraulically controlled by an input command may vary depending upon the state of the hydraulic pump. For example, for a given input command, an implement response may be delayed by hydraulic pump upstroke (hydraulic pump starting). This not only affects the time taken to accomplish a task, it also affects the productivity of the operator who has to continuously account for the variations in pump operation when issuing input commands to achieve performance from the implement. Moreover, implement response may be even further critical in automated applications as these applications may not fully compensate for a delayed response.

One control apparatus for a hydraulic excavator is disclosed in U.S. Pat. No. 5,999,872. In this patent, a control apparatus for a hydraulic excavator is capable of carrying out precise operations according to various kinds of classifications of works. The apparatus includes a classification of work discriminating section for recognizing a classification of work being carried out by the hydraulic excavator on the basis of data detected by sensors for detecting an operating amount of a lever for a boom and the like. The apparatus includes sections for setting an operating mode of hydraulic pumps absorbing horse power and the like, according to the classification of work recognized. The apparatus includes a hydraulic pump control section for controlling the hydraulic pumps according to the set operating mode and an auto acceleration control section for making effective or invalid the auto acceleration control for controlling speed of an engine to a low speed when work stops.

It would accordingly be beneficial to have a mechanism to control the fluid flow through a hydraulic valve and associated operation of a pump in order to have improved performance of the hydraulic system.

SUMMARY

In one aspect, the disclosure is directed to a process of controlling a hydraulic system in a work machine, the process including opening a valve of the hydraulic system such that there is a flow from a hydraulic pump to a work implement system via a controller, determining if an operation of the hydraulic system of the work machine meets a predetermined criteria via the controller, operating a drain valve of the hydraulic system such that there is a minimum flow from a hydraulic pump to a drain if the operation of the hydraulic system of the work machine does not meet the predetermined criteria via the controller, and operating the drain valve of the hydraulic system such that there is a limited flow from the hydraulic pump to the drain if the operation of the hydraulic system of the work machine meets the predetermined criteria via the controller.

In another aspect, the disclosure is directed to a process of controlling a hydraulic system in a work machine, the process including determining if an operation of the hydraulic system of the work machine meets a predetermined criteria with a controller, operating a drain valve of the hydraulic system such that there is a minimum flow from a hydraulic pump to a drain if the operation of the hydraulic system of the work machine does not meet the predetermined criteria via the controller, and operating the drain valve of the hydraulic system such that there is a limited flow from the hydraulic pump to the drain if the operation of the hydraulic system of the work machine meets the predetermined criteria via the controller, where the predetermined criteria comprises at least a predetermined time period T since the work implement system of the work machine has been operated.

In still another aspect, the disclosure is directed to a system for controlling fluid flow through a hydraulic valve in a work machine, the system including an input controller to generate an input command, a controller configured to receive the input command, the controller further configured to determine a valve command corresponding to the input command, a hydraulic valve and a drain valve at least indirectly connected to the controller, the hydraulic valve configured to receive the valve command to control the fluid flow therethrough, the controller further configured to determine if an operation of the hydraulic system of the work machine meets a predetermined criteria with the controller, the controller further configured to operate the drain valve of the hydraulic system such that there is a minimum flow from a hydraulic pump to a drain if the operation of the hydraulic system of the work machine does not meet the predetermined criteria with the controller, and the controller further configured to operate the drain valve of the hydraulic system such that there is a limited flow from the hydraulic pump to the drain if the operation of the hydraulic system of the work machine meets the predetermined criteria with the controller, where the predetermined criteria comprises at least a predetermined time period since the work implement system of the work machine has been operated.

These and other aspects and features of the disclosure will be more readily understood upon reading the following description when taken in conjunction with the accompanying drawings.

While the disclosure is susceptible to various modifications and alternative constructions, certain illustrative aspects thereof, will be shown and described below in detail. It should be understood, however, that there is no intention to be limited to the specific aspects disclosed, but on the contrary, the intention is to cover all modifications, alternative constructions, and equivalents along within the spirit and scope of the disclosure.

DETAILED DESCRIPTION

The disclosure teaches, among other things, a system and method for controlling fluid flow through a hydraulic system in a work machine. The fluid flow may be controlled by a controller, and a main implement valve can be constructed with a neutral bypass rail and a drain valve that allows a tunable amount of minimum pump flow while spools of the main implement valve are in a neutral configuration. This construction improves overall implement response as the pump is partially upstroked prior to a command to actuate an implement. Moreover, to minimize fuel consumption, the minimum pump flow can be stopped by operation of the drain valve allowing the hydraulic pump operation to be suspended.

Figure 1:
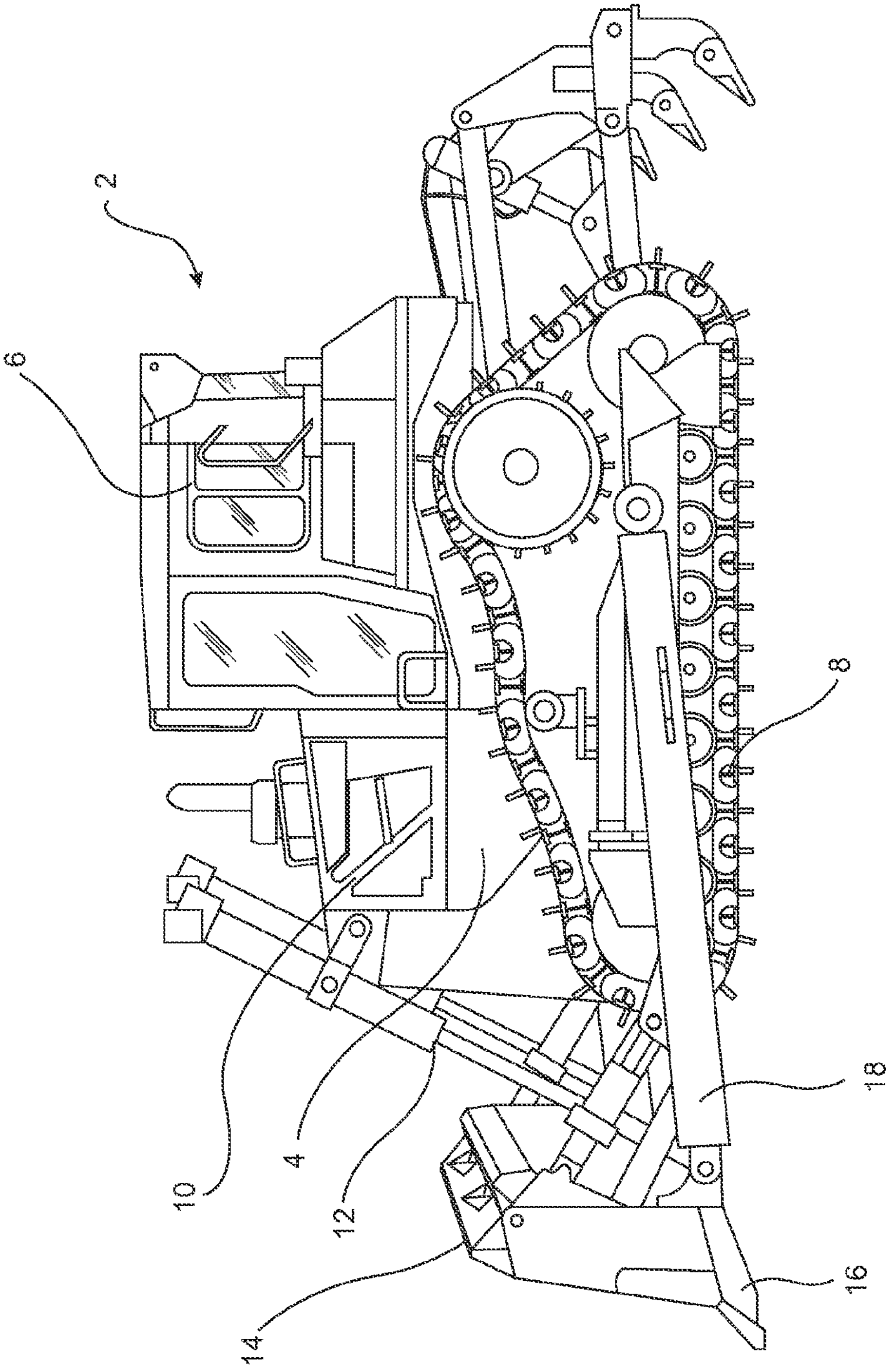
FIG. 1 is a side view of an exemplary work machine constructed in accordance with at least some aspects of the disclosure.

FIG. 1 is a side view of an exemplary work machine constructed in accordance with at least some aspects of the disclosure. Referring to FIG. 1, the work machine 2 is shown. While the work machine 2 has been shown to be a track type tractor, it will be understood that in other aspects, the work machine 2 may be a wheel loader, skid-steer loader, a backhoe-loader, other type of small, medium or large track or wheel type tractor or loader, a harvester, a paving machine, or any other type of work, construction, agricultural or earth moving machine that utilizes a hydraulically actuatable implement or component for accomplishing a task.

The work machine 2 may include a frame 4 connected at least indirectly to an operator station 6. Tracks 8 or other ground engaging mechanism (such as wheels with tires) may be employed for navigating the work machine 2. The frame 4 may house a power source, such as an engine 10 and other power train components (such as a transmission, not shown) for generating and delivering power to operate the work machine 2. The engine 10 may be a gasoline, diesel, natural gas, combinations thereof, or any other type of engine that is commonly employed with such work machines. The work machine 2 may even draw power from other power sources, such as electricity, fuel cells, etc. The frame 4 may also house a hydraulic system for hydraulically actuating an implement system 14. The hydraulic system, as described below, provides a mechanism to not only achieve a faster response from the implement system 14, but also provide better fuel economy along with reduced wear and tear to the hydraulic system.

The implement system 14 may include a work implement, such as a blade 16. The blade 16 may be configured for secure attachment to the work machine 2, and for release and substitution of another implement when desired. The blade 16 may be connected for operation to the frame 4 by a mount 18. The operation of the mount 18 may be controlled by one or more actuators, such as, hydraulic cylinders 12. The hydraulic cylinders 12 may be extended or retracted to operate the mount 18. The operation of the hydraulic cylinders 12 may in turn be controlled by the hydraulic system under command of an operator operating the work machine 2. Alternatively, the operation of the hydraulic cylinders 12 may in turn be controlled by the hydraulic system under command by an automatic controller operating the work machine 2.

With respect to the operator station 6, although not visible in the figures, it may include a plurality of operator controls and operator interfaces for controlling the operation of the work machine 2 and the various work implements, such as the blade 16, connected thereto, as well as for navigating and steering the work machine 2 on a work surface. For instance, the operator station 6 may house various hand controlled operator interfaces, such as, joystick controls, pedals, buttons, instrument panels, gauges and warning lamps for keeping the operator aware of any critical system information, as well as safety and convenience features such as cup holders, lights, etc. In at least some aspects, the operator station 6 may also house at least a portion of a control system 20 (See FIG. 2), described in greater detail below. Other devices and components that commonly exist in such machines may be present in the operator station 6 of the work machine 2. Alternatively, the operator station 6 may be vacant and the work machine operated remotely or autonomously.

Notwithstanding the components of the work machine 2 described above, it will be understood that several other components of the work machine 2, as well as components that may be employed in combination or conjunction with the work machine are contemplated and considered within the scope of the disclosure.

Figure 2:
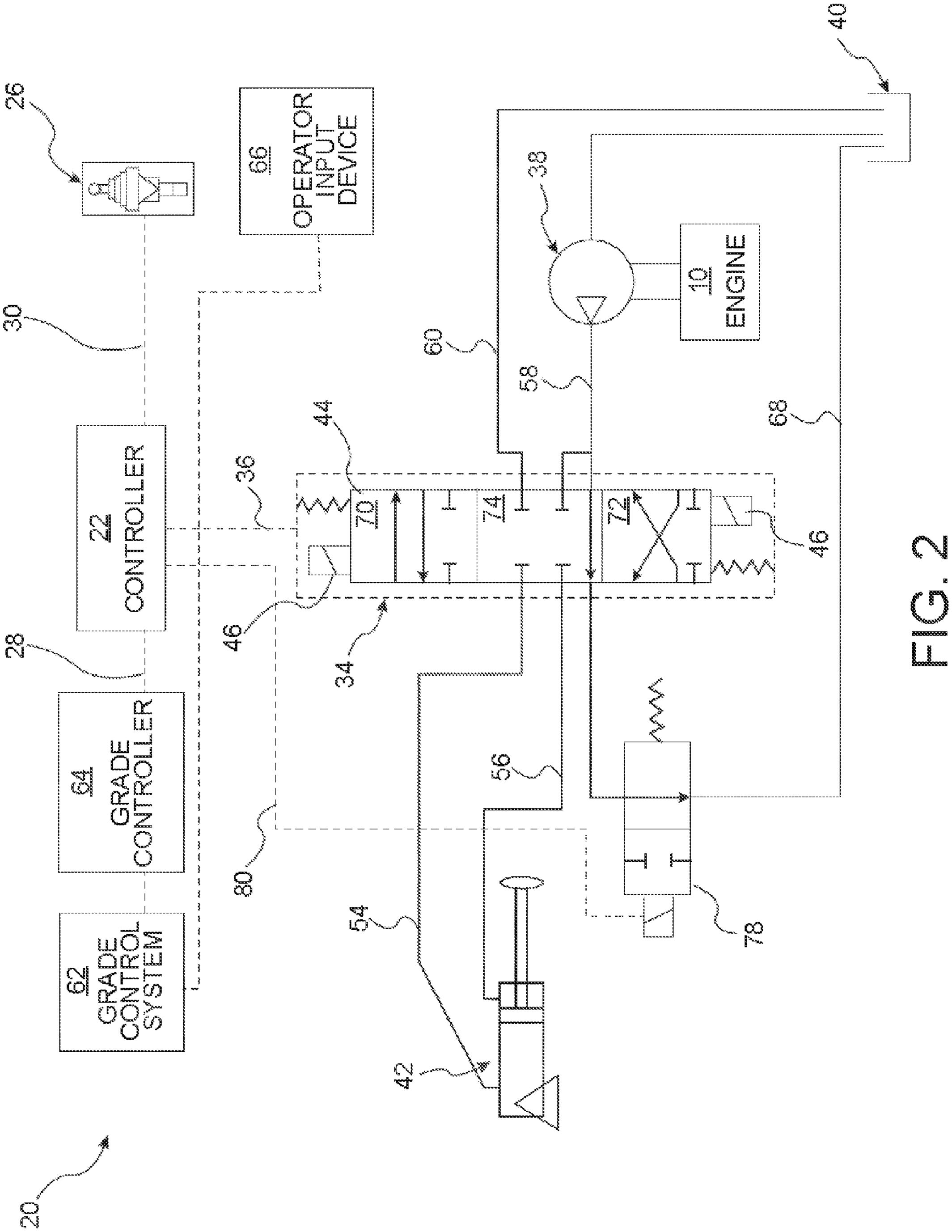
FIG. 2 is a schematic of a control system utilized to control a flow of hydraulic fluid within the work machine of FIG. 1, in accordance with at least some aspects of the disclosure.

FIG. 2 is a schematic of a control system utilized to control the flow of hydraulic fluid within the work machine of FIG. 2, in accordance with at least some aspects of the disclosure. The control system 20 may include a controller 22 capable of at least indirectly receiving information from an input controller 26. The controller 22 may be a standalone, networked, embedded, or general purpose processing system.

While in at least some aspects, the controller 22 may be housed within the operator station 6, this need not always be the case. In other aspects, the controller 22 or portions thereof may be housed elsewhere on the work machine 2. Furthermore, the controller 22 may communicate with the input controller 26 via a communication link 30. The communication link 30 may be wired or wireless communication links including, radio channels and links that may include a communication channel as defined herein. Other types of communication links (such as mechanical links) that are employed in work machines may also be used for the communication link 30.

The control system 20 further may include a grade control system 62, and a grade controller 64. The grade controller 64 may be configured to receive inputs from an operator input device 66 and/or the grade control system 62 to control a movement of the implement system 14 by instructing the controller 22 based on a loading condition of the implement system 14, a machine speed, and a position of the implement system 14 individually or collectively in pre-determined combinations. The grade control system 62 and the grade controller 64 may include one or more control modules (e.g. ECMs, ECUs, etc.). The one or more control modules may include processing units, memory, sensor interfaces, and/or control signal interfaces (for receiving and transmitting signals). The processing units may represent one or more logic and/or processing components used by the grade control system 62 to perform certain communications, control, and/or diagnostic functions. For example, the processing units may be configured to execute routing information among devices within and/or external to the grade control system 62.

According to an aspect of the disclosure, the grade controller 64 may direct the implement system 14 through the controller 22 to move to a desired implement position in response to a desired position signal received from the grade control system 62. The desired position signal is indicative of an automatically determined position of the implement system 14 by the grade control system 62. The desired position signal indicative of the automatically determined position of the implement system 14 may include a desired elevational signal, such as, for example, the height it is desired to have the blade 16 above the worksite. The desired position signal may or may not include a desired tilt angle of the blade. In an aspect of the disclosure, the grade controller 64 may process the desired position signal, the speed signal, the implement position signal, and the load signal to output a machine control command to the controller 22 to actuate the implement system 14. Furthermore, the controller 22 may communicate with the grade controller 64 via a communication link 28. The communication link 28 may be wired or wireless communication links including, radio channels and links that may include a communication channel as defined herein.

Moreover, the automatically determined desired position of the implement system 14 may be based on an input received from a site design. The site design may include data related to a construction surface of the worksite based on an engineering design. The construction surface provided in the site design may represent a ground profile indicative of an irregular three-dimension (3D) surface or a flat plane. The construction surface may be a design plane that represents a desired cutting plane or a final grade for the worksite. The grade control system 62 may be configured to determine a relative desired location or position of the implement system 14 with respect to the design plane. Moreover, the grade control system 62 may be configured to determine a relative location or position of the work machine 2 within the worksite. The relative location or position of the work machine 2 and/or the implement system 14 may be determined using one or more position sensors, GNSS receivers, and/or laser systems, which are well-known in the art. In the illustrated aspect, the grade control system 62 receives the input from the site design indicative of the design plane for the worksite and the relative position of the implement system 14 with respect to the design plane and outputs the desired position signal as a function of these inputs.

Relatedly, the controller 22 may receive information (e.g., commands) from the input controller 26. The input controller 26 may be any of a variety of input devices, some of which, such as joysticks, are described above and may be utilized by an operator to issue commands for controlling various aspects of the work machine 2. The input controller 26 may be located within the operator station 6, elsewhere on the work machine 2, or even remotely in the case of a remote controlled vehicle. By virtue of operating the input controller 26, an input command identifying the operation (e.g., movement of the implement system 14) may be determined or sensed to the controller 22 via the communication link 30. The input controller 26 may, in at least some aspects, also include interfaces with electronic control such as, global navigation satellite systems (GNSS) and laser guided systems to communicate with the controller 22.

Utilizing the input command from the input controller 26 and/or the grade controller 64, the controller 22 may control a hydraulic valve 34 via communication link 36. The communication link 36 may be wired or wireless communication links including, radio channels and links that may include a communication channel as defined herein. It will be understood that for purposes of explanation, only one hydraulic valve 34 has been shown in the disclosure. Typically, however, several hydraulic valves, controlling various aspects of the work machine 2 may be present and, some or all of those hydraulic valves may be controlled by the controller 22.

With respect to the hydraulic valve 34, in at least some aspects, it may be a non-compensated valve configured to communicate fluid between the hydraulic pump 38, a tank 40 and a hydraulically powered device 42, such as, the hydraulic cylinders 12 or a hydraulic motor. Furthermore, in at least some aspects, the hydraulic valve 34 may be a supply valve or a drain valve. Other types of hydraulic valves that are commonly used in work machines may also be used for purposes of this disclosure. As shown, the hydraulic valve 34 may include a valve spool 44 and an actuator 46 to control the flow of hydraulic fluid (e.g., flow rate) therethrough. The actuator 46 may include an armature having a solenoid wound therearound and, thus, may be electrically controlled. In other aspects, other types of actuators may be employed as well.

The hydraulic pump 38 may be configured to operate on demand. In this regard, when there is a demand to operate the implement system 14, the hydraulic pump 38 may be configured to continuously operate to provide improved response in the operation of the implement system. Additionally, when there is at least a minimum flow of hydraulic fluid in the system, the hydraulic pump 38 may be configured to continuously operate to provide improved response in the operation of the implement system as well. Finally, when there is a limited and/or no flow of hydraulic fluid in the system, the hydraulic pump 38 may be configured to suspend operation to improve fuel economy and reduce wear and tear on the hydraulic pump 38. In this regard, the limited flow of hydraulic fluid includes a range of hydraulic fluid flow that may suspend operation of the hydraulic pump 38 that includes no flow or zero flow.

As further shown in FIG. 2, the hydraulically powered device 42 may include a first hydraulic line 54 and a second hydraulic line 56. Moreover, the control system 20 may further include a first drain line 60 and a second drain line 68. Additionally, the control system 20 may further include a hydraulic source line 58 connected to the hydraulic pump 38.

The controller 22 may apply a current signal to the solenoid for actuating the actuator 46, which in turn may displace the valve spool 44. Displacing the valve spool 44 may vary the opening area of one or more orifices to vary the hydraulic fluid flow through the hydraulic valve 34. Notwithstanding the fact that in the present aspect, the hydraulic valve 34 has been shown with three of the orifices, in at least some aspects, the number of orifices may vary. The hydraulic pump 38 may supply pressurized hydraulic fluid from the tank 40 to the hydraulically powered device 42 through the hydraulic valve 34. Pressurized hydraulic fluid may also flow from the hydraulically powered device 42 back to the tank 40.

With further reference to FIG. 2, when the valve spool 44 is positioned to utilize spool portion 70, the hydraulic pump 38 provides hydraulic fluid to the second hydraulic line 56 and the first hydraulic line 54 is configured to drain to the first drain 60 into the tank 40. The drain line 68 may be closed in that configuration.

When the valve spool 44 is positioned to utilize valve spool portion 72, the hydraulic pump 38 provides pressurized hydraulic fluid to the first hydraulic line 54 and the second hydraulic line 56 is configured to drain into the first drain line 60. The drain line 68 may be closed in that configuration.

When the valve spool 44 is positioned to utilize valve spool portion 74, the hydraulic pump 38 provides pressurized hydraulic fluid to the second drain line 68. The first hydraulic line 54 and the second hydraulic line 56 may be closed in that configuration.

Moreover, the control system 20 may further include a drain valve 78 operated via communication link 80. The communication link 80 may be wired or wireless communication links including, radio channels and links that may include a communication channel as defined herein. The drain valve 78 may be implemented as an on/off valve or alternatively as a proportional valve. When the drain valve 78 is open, a minimum flow of hydraulic fluid may flow from the hydraulic source line 58 to the second drain line 68. On the other hand, when the drain valve 78 is closed, there may be no flow of hydraulic fluid from the hydraulic source line 58 to the second drain line 68. Additionally, when the drain valve 78 is operated as a proportional valve, a more limited proportional flow of hydraulic fluid may flow from the hydraulic source line 58 to the second drain line 68. Additionally, the operation of the drain valve 78 may be tunable so that the minimum flow and/or limited flow can be adjusted as needed and/or desired.

In at least some aspects and, as shown, the hydraulic pump 38 may be a fixed displacement pump, although other types of pumps (e.g., variable displacement pumps) that are commonly employed in hydraulic systems may be employed as well. Relatedly, the tank 40 may be a reservoir or other type of fluid source that may be capable of storing a supply of fluid, such as, hydraulic fluid, lubrication oil, transmission oil or other types of machines oils and fluids utilized within the work machine 2.

Figure 3:
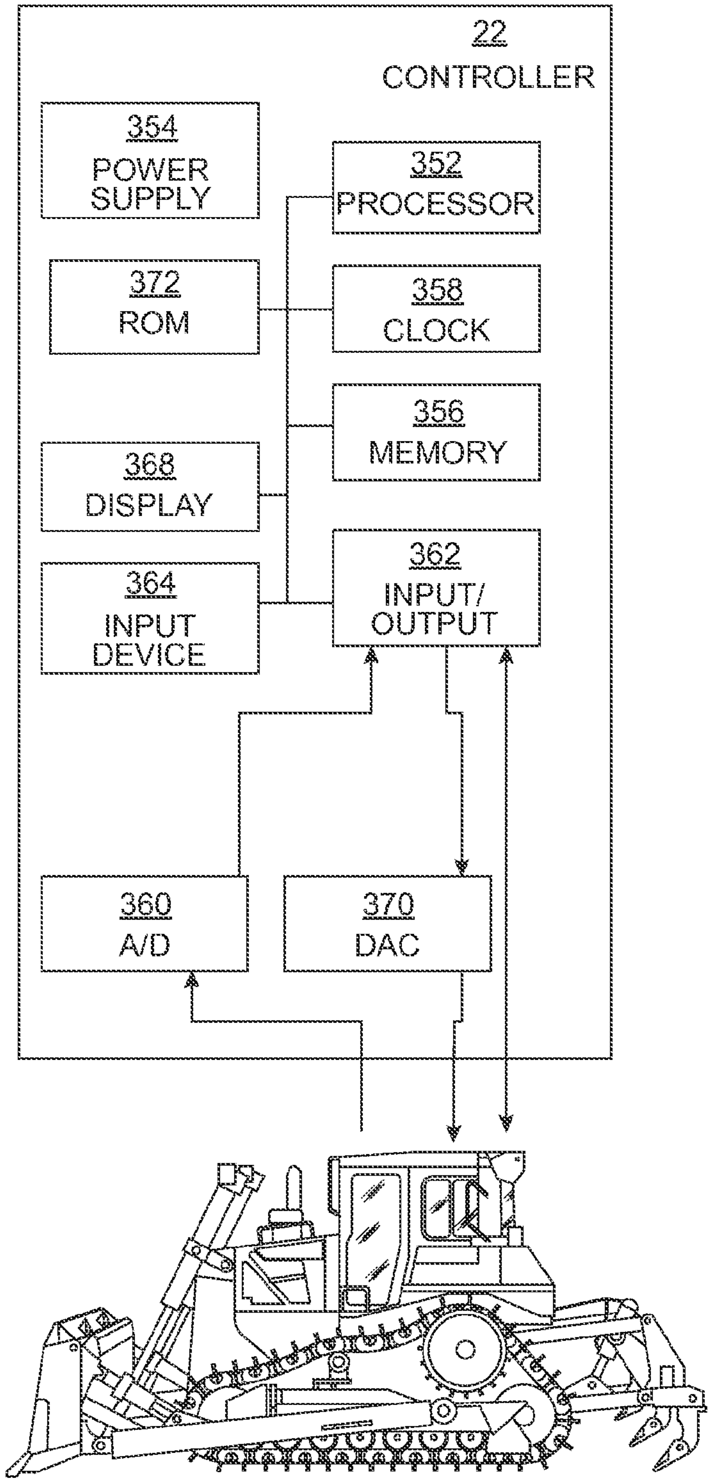
FIG. 3 is a detailed schematic of a controller of the control system of FIG. 2, in accordance with at least some aspects of the disclosure.

FIG. 3 is a detailed schematic of a controller of the control system of FIG. 2, in accordance with at least some aspects of the disclosure. The controller 22 may receive sensor outputs from a temperature sensor sensing temperature from any part of the work machine 2, a pressure sensor sensing pressure from a part of the work machine 2, a position sensor sensing position of a part the work machine 2, and the like.

The controller 22 may include a processor 352. This processor 352 may be operably connected to a power supply 354, a memory 356, a clock 358, an analog to digital converter (A/D) 360, an input/output (I/O) port 362, and the like. The I/O port 362 may be configured to receive signals from any suitably attached electronic device and forward these signals from the A/D 360 and/or to processor 352. These signals include signals from the temperature sensor, the pressure sensor, the position sensor. If the signals are in analog format, the signals may proceed via the A/D 360. In this regard, the A/D 360 may be configured to receive analog format signals and convert these signals into corresponding digital format signals.

The controller 22 may include a digital to analog converter (DAC) 370 that may be configured to receive digital format signals from the processor, convert these signals to analog format, and forward the analog signals. In this manner, electronic devices configured to utilize analog signals may receive communications or be driven by the processor 352. The processor 352 may be configured to receive and transmit signals to and from the DAC 370, A/D 360 and/or the I/O port 362. The processor 352 may be further configured to receive time signals from the clock 358. In addition, the processor 352 may be configured to store and retrieve electronic data to and from the memory 356. The controller 22 may further include a display 368, an input device 364, and a read-only memory (ROM) 372. Finally, the processor 352 may include a program stored in the memory 356 executed by the processor 352 to execute a process 400, a process 500, and/or a process 600 described below.

As will be discussed further below with respect to FIGS. 4, 5 and 6, the controller 22 may be utilized to ensure a flow of hydraulic fluid through one or more of the orifices of the hydraulic valve 34 and through the drain valve 78, thereby ensuring a consistent performance and response from the hydraulically powered device 42. On the other hand, the controller 22 may be utilized to ensure a limited or no flow of hydraulic fluid through one or more of the orifices of the hydraulic valve 34 and through drain valve 78, thereby ensuring reduced hydraulic pump operation and greater fuel economy of the work machine 2.

Notwithstanding the components of the control system 20 described above, it will be understood that several other components and/or systems that are commonly used within the control systems of work machines may be employed. For example, the control system 20 may include various other types of sensors for reading and/or sensing other parameters within the work machine 2, other hydraulic pumps and fluid sources, pressure compensator devices, etc.

INDUSTRIAL APPLICABILITY

In general, the disclosure has industrial applicability in connection with a wide range of machines used in agricultural, construction and earth moving operations. More specifically, the disclosure sets forth a system for optimizing a hydraulic system in such machines. The control system is configured to receive input commands from an input controller and/or a grade control system and grade controller. The control system ensures a minimum fluid flow through a hydraulic valve for continued operation of a hydraulic pump at certain times. In doing so, performance and response time of hydraulically controlled devices of the above mentioned machines is improved. Moreover, the control system limits fluid flow through a hydraulic valve for suspension of operation of the hydraulic pump during other times. In doing so, wear and tear for the hydraulic pump are reduced and fuel efficiency of the work machine is improved.

Figure 4:
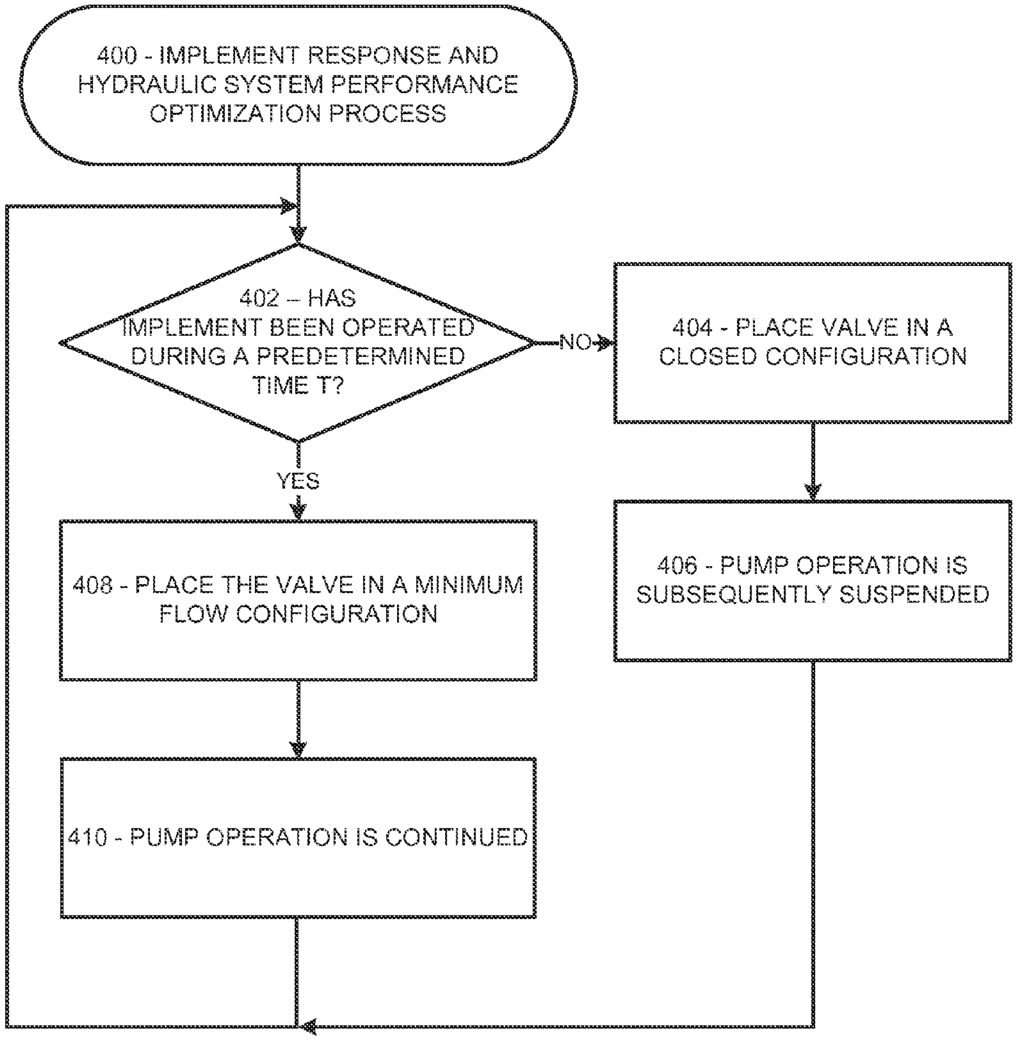
FIG. 4 is a flowchart outlining exemplary steps that the control system of FIG. 2 may follow in controlling the hydraulic fluid flow.

FIG. 4 is a flowchart outlining exemplary steps that the control system of FIG. 2 may follow in controlling the hydraulic fluid flow. In particular, FIG. 4 illustrates an implement response and hydraulic system performance optimization process 400. In box 402, the controller 22 may determine whether the implement system 14 has been operated during a predetermined time T. In this regard, the controller 22 may provide control signals to the hydraulic valve 34 to operate the implement system 14. The controller 22 operating in response to the input controller 26 and/or the grade control system 62 and grade controller 64. If the time T has passed since the controller 22 has provided control signals to the hydraulic valve 34 to operate the implement system 14, the controller 22 may place the drain valve 78 in the closed (or proportionally closed) configuration as shown in box 404. As there is no requirement for hydraulic fluid, the hydraulic pump 38 operation may be subsequently suspended at box 406. Suspending operation of the hydraulic pump 38 when not needed reduces wear and tear on the hydraulic pump 38 and increases fuel economy for the work machine 2.

On the other hand, the process of box 402 may determine that the controller 22 has controlled the implement system 14 during the predetermined time T. In this regard, the controller 22 may have provided control signals to the hydraulic valve 34 to operate the implement system 14. The controller 22 operating in response to the operator input to the input controller 26 and/or the grade control system 62 and grade controller 64. As the time T has not passed since the controller 22 has provided control signals to the hydraulic valve 34 to operate the implement system 14, the controller 22 may place the drain valve 78 in the minimum flow configuration as shown by box 408. Accordingly, the hydraulic pump 38 operation is subsequently continued as shown in box 410. Moreover, as the hydraulic pump 38 continues to operate, any resulting operation of the implement system 14 may have optimal response timing.

The time T may a predetermined value of seconds, minutes, or the like. For example, when the grade control system 62 and grade controller 64 are the source of control for the controller 22, the time T may be a value between 1 and 3 seconds. Other machines and implement systems may utilize different times as contemplated by the disclosure. The same value T may be utilized when the controller 22 is operating in response to the operator input to the input controller 26. Alternatively, there may be a time T for when the grade control system 62 and grade controller 64 are the source of control for the controller 22 and another time T when the controller 22 is operating in response to the operator input to the input controller 26. The value T being set based on an optimal time period such that the suspended operation of the hydraulic pump 38 may be optimal for fuel consumption and optimal for response timing. This value of T may be a predetermined time or determined based on historical operation of the work machine 2 over a given time period of minutes, hours, days, or the like.

Figure 5:
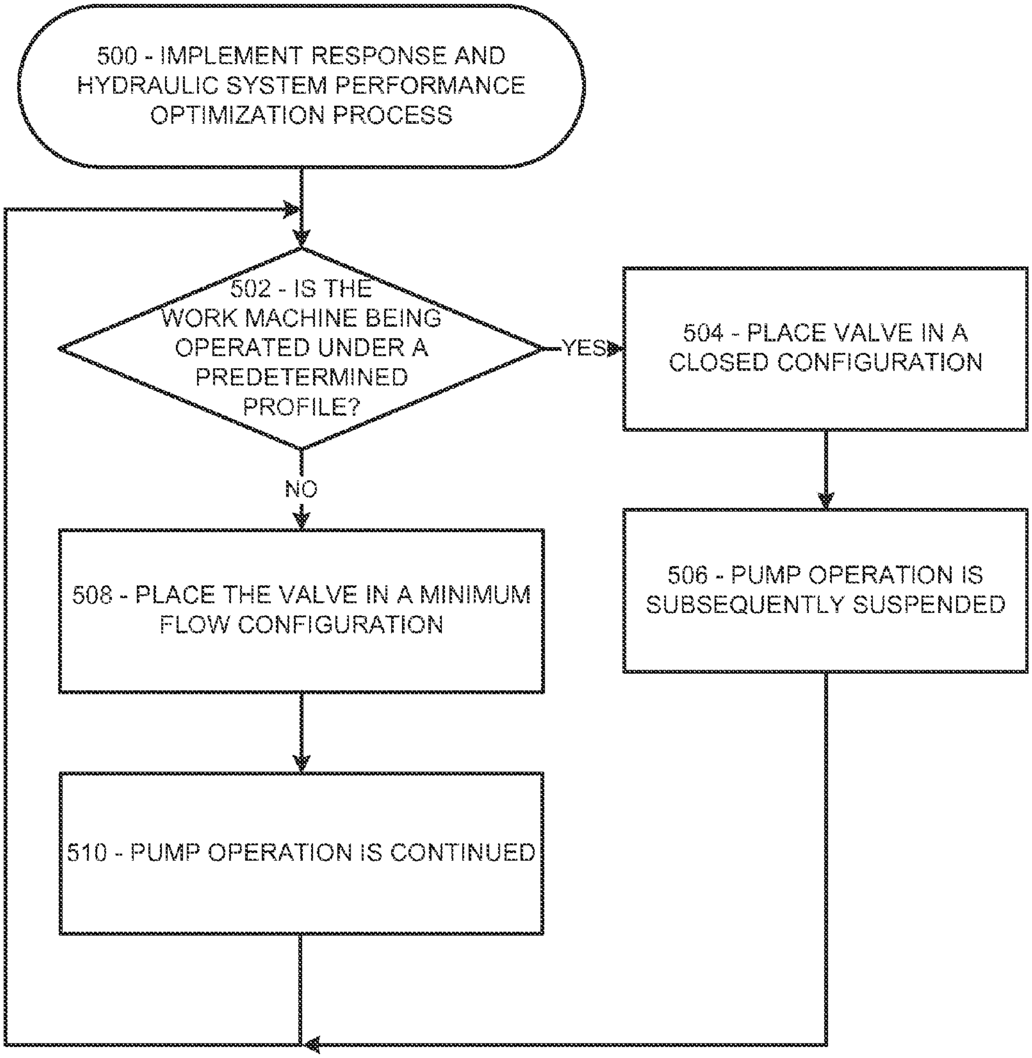
FIG. 5 is another aspect of a flowchart outlining exemplary steps that the control system of FIG. 2 may follow in controlling the hydraulic fluid flow.

FIG. 5 is another aspect of a flowchart outlining exemplary steps that the control system of FIG. 2 may follow in controlling the hydraulic fluid flow. In particular, FIG. 5 illustrates an implement response and hydraulic system performance optimization process 500. In box 502, the controller 22 may determine whether the implement system 14 has been operated under a predetermined profile.

If the predetermined profile is currently being operated by the work machine 2, the controller 22 may place the drain valve 78 in the closed (or proportionally closed) configuration as shown in box 504. As there is no requirement for hydraulic fluid, the hydraulic pump 38 operation may be subsequently suspended at box 506. Suspending operation of the hydraulic pump 38 when not needed reduces wear and tear on the hydraulic pump 38 and increases fuel economy for the work machine 2.

The operation under a predetermined profile can include any number of types of operations where it is less likely that the work machine 2 will utilize the implement system 14. For example, if the work machine 2 transmission is placed in a neutral drive configuration or in a park configuration, it is less likely that the work machine 2 will utilize the implement system 14. Such condition being determined or sensed by the controller 22. Accordingly, such an operation may be an operation under a predetermined profile.

Alternatively or additionally, if the work machine 2 transmission is placed in reverse, it is less likely that the work machine 2 will utilize the implement system 14. Such condition being determined or sensed by the controller 22. Accordingly, such an operation may be an operation under a predetermined profile.

Alternatively or additionally, if the work machine 2 is idling, it is less likely that the work machine 2 will utilize the implement system 14. Such condition being determined or sensed by the controller 22. Accordingly, such an operation may be an operation under a predetermined profile.

Alternatively or additionally, if the work machine 2 implement system 14 is in a raised position, it is less likely that the work machine 2 will utilize the implement system 14. Such condition being determined or sensed by the controller 22. Accordingly, such an operation may be an operation under a predetermined profile.

Alternatively or additionally, if the work machine 2 is not engaging a work surface as determined or sensed by one or more sensors associated with the implement system 14, it is less likely that the work machine 2 will utilize the implement system 14. Such condition being determined or sensed by the controller 22. Accordingly, such an operation may be an operation under a predetermined profile.

Alternatively or additionally, other predetermined profiles may be programmed into the logic of the controller 22 that are indicative that it is less likely that the work machine 2 will utilize the implement system 14. Accordingly, such other predetermined profiles may be an operation under a predetermined profile.

On the other hand, the process of box 502 may determine that the work machine 2 is not operating under a predetermined profile. Accordingly, the controller 22 may place the drain valve 78 in the minimum flow configuration as shown by box 508. Accordingly, the hydraulic pump 38 operation is continued as shown in box 510. Moreover, as the hydraulic pump 38 continues to operate, any resulting operation of the implement system 14 may have optimal response timing.

Figure 6:
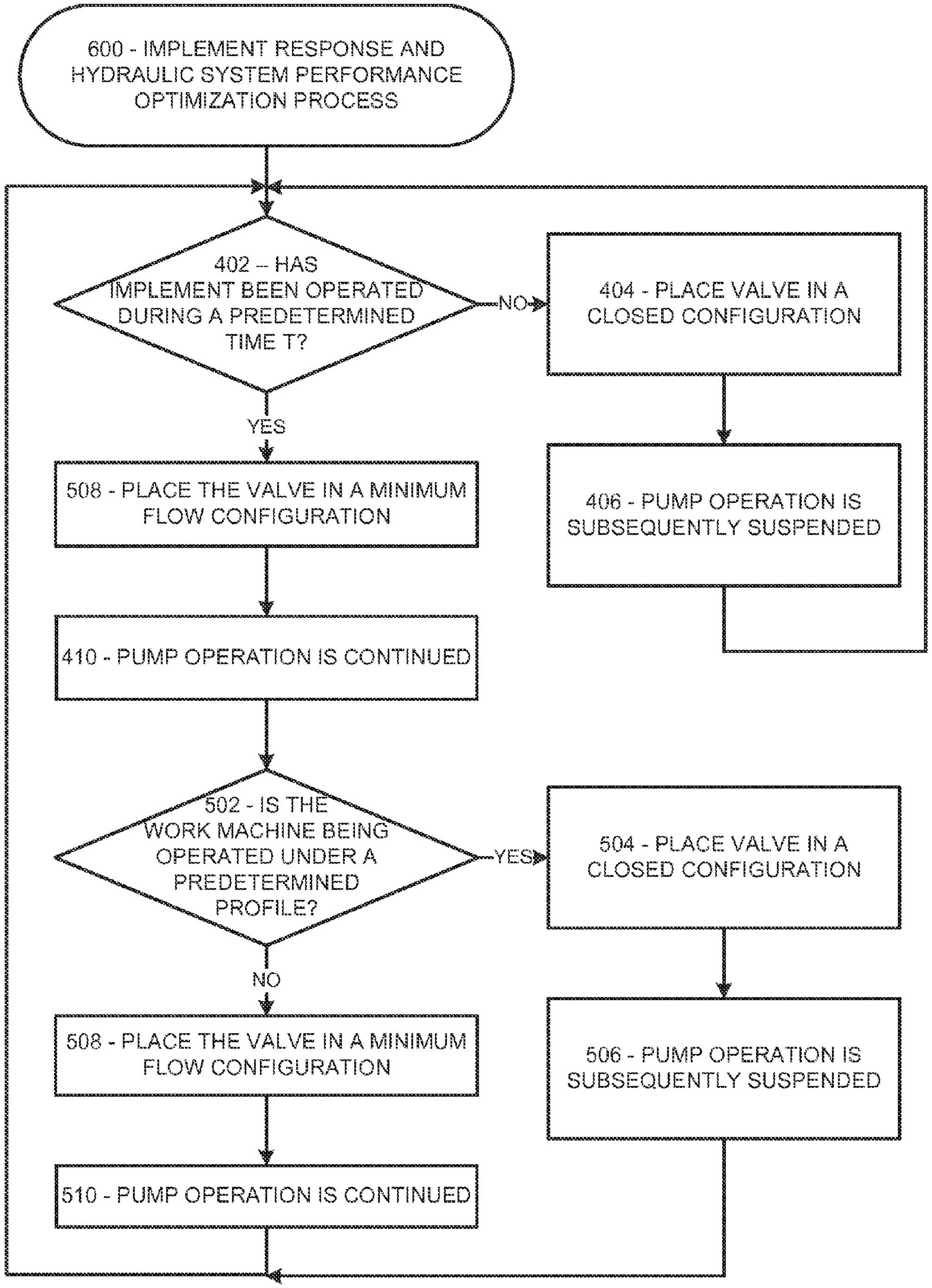
FIG. 6 is another aspect of a flowchart outlining exemplary steps that the control system of FIG. 2 may follow in controlling the hydraulic fluid flow.

FIG. 6 is another aspect of a flowchart outlining exemplary steps that the control system of FIG. 2 may follow in controlling the hydraulic fluid flow. In particular, FIG. 6 illustrates a process 600 that combines process 400 and process 500 described above. Each of the aforementioned boxes being implemented consistent as described previously. The process 600 allows for the suspension of operation of the hydraulic pump 38 when not needed to reduce wear and tear on the hydraulic pump 38 and increase fuel economy for the work machine 2. Moreover, as the hydraulic pump 38 continues to operate under certain conditions, any resulting operation of the implement system 14 may have optimal response timing.

By virtue of controlling the flow of fluid through the control system 20, the disclosure provides a mechanism and process to not only achieve a faster response from those devices, but also provide better fuel economy along with reduced wear and tear to the hydraulic pump 38. Accordingly, the efficiency and productivity of the operator is increased as well and the operator may have a better control on the vehicle and the various hydraulically powered implements.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. A process of controlling a hydraulic system in a work machine, the process comprising:

opening a valve of the hydraulic system such that there is a flow from a hydraulic pump to a work implement system via a controller;

determining if an operation of the hydraulic system of the work machine meets a predetermined criteria via the controller;

operating a drain valve of the hydraulic system such that there is a minimum flow from the hydraulic pump to a drain if the operation of the hydraulic system of the work machine does not meet the predetermined criteria via the controller; and operating the drain valve of the hydraulic system such that there is a limited flow from the hydraulic pump to the drain if the operation of the hydraulic system of the work machine meets the predetermined criteria via the controller.

2. The process of claim 1, wherein the predetermined criteria comprises a predetermined time period T since the work implement system of the work machine has been operated.

3. The process of claim 1, wherein the predetermined criteria comprises at least one of the following: reverse gear operation of the work machine, idling operation of the work machine, and neutral gear operation of the work machine.

4. The process of claim 1, wherein the operating the drain valve of the hydraulic system such that there is the minimum flow from the hydraulic pump to the drain further comprises continuing operation of the hydraulic pump.

5. The process of claim 1, wherein the operating the drain valve of the hydraulic system such that there is the limited flow from the hydraulic pump to the drain further comprises suspending operation of the hydraulic pump.

6. The process of claim 1, wherein the operating the drain valve of the hydraulic system such that there is the limited flow from the hydraulic pump to the drain further comprises no flow from the hydraulic pump to the drain.

7. The process of claim 2, wherein the predetermined time T comprises a first time T responsive to an operation of an input controller;

wherein the predetermined time T further comprises a second time T responsive to an operation of a grade control system; and wherein the first time T is different from the second time T.

8. A process of controlling a hydraulic system in a work machine, the process comprising:

determining if an operation of the hydraulic system of the work machine meets a predetermined criteria with a controller;

operating a drain valve of the hydraulic system such that there is a minimum flow from a hydraulic pump to a drain if the operation of the hydraulic system of the work machine does not meet the predetermined criteria via the controller; and operating the drain valve of the hydraulic system such that there is a limited flow from the hydraulic pump to the drain if the operation of the hydraulic system of the work machine meets the predetermined criteria via the controller, wherein the predetermined criteria comprises at least a predetermined time period T since a work implement system of the work machine has been operated.

9. The process of claim 8, wherein the predetermined criteria further comprises at least one of the following: reverse gear operation of the work machine, idling operation of the work machine, neutral gear operation of the work machine.

10. The process of claim 8, wherein the operating the drain valve of the hydraulic system such that there is the minimum flow from the hydraulic pump to the drain further comprises continuing operation of the hydraulic pump.

11. The process of claim 8, wherein the operating the drain valve of the hydraulic system such that there is the limited flow from the hydraulic pump to the drain further comprises suspending operation of the hydraulic pump.

12. The process of claim 8, wherein the operating the drain valve of the hydraulic system such that there is the limited flow from the hydraulic pump to the drain further comprises no flow from the hydraulic pump to the drain.

13. The process of claim 8, wherein the predetermined time T comprises a first time T responsive to an operation of an input controller;

wherein the predetermined time T further comprises a second time T responsive to an operation of a grade control system; and wherein the first time T is different from the second time T.

14. A system for controlling fluid flow through a hydraulic system in a work machine, the system comprising:

an input controller to generate an input command;

a controller configured to receive the input command, the controller further configured to determine a valve command corresponding to the input command;

a hydraulic valve and a drain valve at least indirectly connected to the controller, the hydraulic valve configured to receive the valve command to control the fluid flow therethrough;

the controller further configured to determine if an operation of the hydraulic system of the work machine meets a predetermined criteria with the controller;

the controller further configured to operate the drain valve of the hydraulic system such that there is a minimum flow from a hydraulic pump to a drain if the operation of the hydraulic system of the work machine does not meet the predetermined criteria with the controller; and the controller further configured to operate the drain valve of the hydraulic system such that there is a limited flow from the hydraulic pump to the drain if the operation of the hydraulic system of the work machine meets the predetermined criteria with the controller, wherein the predetermined criteria comprises at least a predetermined time T since a work implement system of the work machine has been operated.

15. The system of claim 14, wherein the predetermined criteria further comprises at least one of the following: reverse gear operation of the work machine, idling operation of the work machine, neutral gear operation of the work machine.

16. The system of claim 14, wherein when operating the drain valve of the hydraulic system such that there is the minimum flow from the hydraulic pump to the drain, the hydraulic pump is further configured to continue operation.

17. The system of claim 14, wherein when operating the drain valve of the hydraulic system such that there is the limited flow from the hydraulic pump to the drain, the hydraulic pump is further configured to continue operation.

18. The system of claim 14, wherein the predetermined time T comprises a first time T responsive to an operation of an input controller;

wherein the predetermined time T further comprises a second time T responsive to an operation of a grade control system; and wherein the first time T is different from the second time T.

19. A work machine, comprising the system of claim 14 and further comprising:

an engine;

a transmission;

a ground engaging member; and a work implement.

* * * * *